United States Patent [19]

Ljubivy et al.

[11] 4,236,969
[45] Dec. 2, 1980

[54] SYSTEM FOR COOLING SET OF FUEL ASSEMBLIES ARRANGED IN REACTOR VESSEL

[76] Inventors: Alexandr G. Ljubivy, prospekt Gagarina, 200, kv. 172; Vladimir I. Batjukov, ulitsa Prygunova, 9, kv. 29; Tsolak G. Shkhian, naberezanaya Zhdanova, 6, kv. 16; Alexandr I. Fadeev, ulitsa Engelsa, 21, kv. 46, all of Gorky, U.S.S.R.

[21] Appl. No.: 957,025

[22] Filed: Nov. 2, 1978

Related U.S. Application Data

[63] Continuation of Ser. No. 790,975, Apr. 26, 1977, abandoned.

[51] Int. Cl.² ............................................. G21C 15/00
[52] U.S. Cl. ........................................ 176/61; 176/38; 176/30; 250/506
[58] Field of Search .................. 176/50, 61, 30, 38, 176/87, 65; 250/506, 507

[56] References Cited

U.S. PATENT DOCUMENTS

| | | | |
|---|---|---|---|
| 3,133,197 | 5/1964 | Allen | 250/506 |
| 3,230,373 | 1/1966 | Montgomery | 250/507 |
| 3,366,548 | 1/1968 | O'Neil | 176/61 |
| 3,445,335 | 5/1969 | Gluntz | 176/61 |
| 3,981,770 | 9/1976 | Middleton | 176/38 |
| 3,994,777 | 11/1976 | Severson | 176/40 |

FOREIGN PATENT DOCUMENTS

| | | | |
|---|---|---|---|
| 1539669 | 12/1969 | Fed. Rep. of Germany | 176/61 |
| 1346663 | 11/1963 | France | 176/61 |
| 106428 | 4/1965 | Norway | 176/50 |

*Primary Examiner*—Harvey E. Behrend
*Attorney, Agent, or Firm*—Fleit & Jacobson

[57] ABSTRACT

A system for cooling a set of fuel assemblies arranged in a nuclear reactor vessel, comprising a pipeline for the supply of coolant, laid inside the vessel from the level of the coolant filling the vessel to the bottom and having an opening above the active portion of the fuel assemblies, and a pipeline for the removal of coolant from the vessel. The proposed cooling system rules out leakage of coolant from the vessel in case of a rupture of the coolant supply pipeline.

1 Claim, 2 Drawing Figures

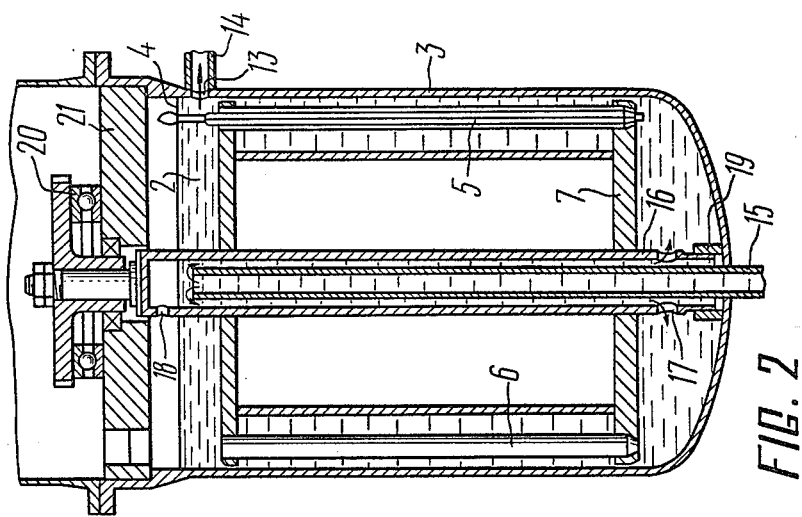
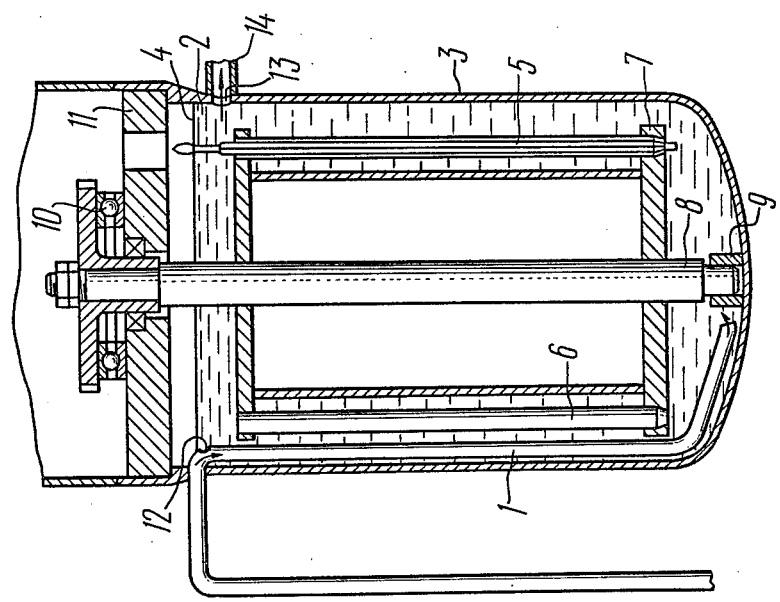

SYSTEM FOR COOLING SET OF FUEL ASSEMBLIES ARRANGED IN REACTOR VESSEL

This is a continuation of application Ser. No. 790,975, filed Apr. 26, 1977 now abandoned.

The present invention relates to nuclear reactors and, more specifically, to a system for cooling a set of fuel assemblies arranged in a reactor vessel.

The proposed cooling system can be used to cool a set of fuel assemblies arranged in a reactor core or placed in a container for used fuel assemblies.

There is known a system for cooling fuel assemblies, arranged in a reactor core, with water used as the coolant, which fills the reactor vessel to a level above the active portion of the fuel assemblies. The cooling system comprises a pipeline for the supply of the coolant to the reactor vessel, and a pipeline for the removal of the coolant therefrom.

The pre-cooled coolant is supplied to the lower part of the vessel through the coolant supply pipeline communicating with the lower part of the vessel, and washes and cooles the fuel assemblies; the warmed-up coolant is removed through the coolant removal pipeline which communicates with the reactor vessel at a level above the active portion of the fuel assemblies.

There is known a vessel for long-term storage of spent fuel assemblies; wherein a set of fuel assemblies is cooled as described above, with water used as the coolant which is supplied to the lower part of the vessel through a coolant supply pipeline and fills the vessel; the coolant is removed from the vessel through a coolant removal pipeline which communicates with the vessel at a level above the active portion of the fuel assemblies.

However, this type of cooling system has a serious disadvantage, which resides in the fact that in case of a rupture of the coolant supply pipeline or a failure of the check valve following a stop of the pump which forces the coolant into the vessel, the coolant leakes out from the vessel, which results in an accident.

It is an object of the present invention to provide a system for cooling a set of fuel assemblies arranged in a nuclear reactor vessel, which would rule out leakage of coolant from the reactor vessel in case of a rupture of the coolant supply pipeline.

The foregoing object is attained by providing a system for cooling a set of fuel assemblies arranged in a nuclear reactor vessel, comprising a pipeline for the supply of coolant to the lower part of the reactor vessel, which coolant fills the vessel to a level above the active portion of the fuel assemblies, and a pipeline for the removal of the coolant from the vessel, in which system part of the coolant supply pipeline extends, according to the invention, inside the vessel, between the level of the coolant and the bottom, there being provided an opening in this portion of the coolant supply pipeline, above the level of the active portion of the fuel assemblies, into which opening there enters gas if the coolant level is lowered to reach the level of said opening.

The proposed system for cooling a set of fuel assemblies prevents leakage of coolant from the vessel containing the fuel assemblies in case of a rupture of the coolant supply pipeline below the level of the active portion of the fuel assemblies, and thus rules out a breakdown of the reactor. This is due to the fact that in case of a pipeline rupture, the level of the coolant in the vessel is only lowered to the level of the opening provided in the coolant supply pipeline, after which the gas above the coolant enters this pipeline and bars the flow of coolant therein. This prevents a drop of pressure in the coolant supply pipeline, which otherwise could result in a leak of coolant.

Other objects and advantages of the present invention will become more apparent from the following detailed description of preferred embodiments thereof to be read in conjunction with the accompanying drawings, wherein:

FIG. 1 is an elevation view of a drum for storing spent fuel assemblies, provided with a cooling system, wherein the coolant supply pipeline extends along the wall of the drum;

FIG. 2 is an elevation view of a drum for storing spent fuel assemblies, with the coolant supply pipeline extending along the drum's axis.

The proposed system for cooling a set of fuel assemblies placed in a drum for storing spent fuel assemblies comprises a pipeline 1 (FIG. 1) for the supply of coolant 2 to a body 3 of the drum.

The coolant 2 is sodium. The coolant 2 fills the body 3 to a level 4 above the active portion of fuel assemblies 5.

The fuel assemblies 5 are installed in tubular sockets 6 of a holder 7 mounted on an axle 8 which turns the holder 7 when the fuel assemblies 5 are recharged. For this purpose, one end of the axle 8 abuts against a bushing 9, whereas its opposite end abots through a bearing 10 against a lid 11.

A portion of the pipeline 1 for the supply of the coolant 2 extends inside the drum body 3, along its wall between the level 4 and the bottom of the body 3.

An opening 12 is provided in this portion of the pipeline 1, close to the level 4 of the coolant 2. When the level 4 of the coolant 2 is lowered the gas contained in the drum body 3 above the level 4 of the coolant 2 enters said opening 12.

In the drum body 3, near the level 4, there is provided an opening 13 through which a pipeline 14 for removing the coolant 2 from the drum communicates with the latter.

The set of the fuel assemblies 5 is cooled as follows. The pre-cooled coolant 2, which is sodium, is supplied through the pipeline 1 for the supply of the coolant 2 to the lower part of the drum body 3 and fills the latter to the level 4 which must be above the active portion of the fuel assemblies 5. The coolant 2 cools the fuel assemblies 5 and, when warmed up, is removed from the drum body 3 through the pipeline 14 for the removal of the coolant 2.

In case of a rupture the out-of-the vessel portion of the pipeline 1 below the level of the active portion of the fuel assemblies 5, the level 4 of the sodium 2 in the drum body 3 is lowered to the level of the opening 12. The gas above the sodium enters through the opening 12 into the pipeline 1 for the supply of the coolant 2 and thus prevents leakage of sodium from the drum body 3. As a result, there will be no reactor accident in case of a rupture of the coolant supply pipeline 1, because the fuel assemblies 5 are cooled due to natural circulation of sodium in the drum body 3 until they are removed therefrom.

FIG. 2 shows an alternative embodiment of the invention, according to which a pipe 15 of the coolant supply pipeline 1 extends through an opening provided in the bottom of the drum body 3 into a hollow axle 16 to reach the level 4. Close to the bottom of the drum, the hollow axle 16 has four openings 17 for the supply of sodium to the lower part of the drum body 3. Close to the level 4, the hollow axle 16 has an opening 18. One end of the axle 16 abuts against a bushing 19, whereas its opposite end through a bearing 20 against a lid 21.

Cooled sodium is supplied through the pipe 15 of the pipeline 1 for the supply of the coolant 2 into the spacing between the pipe 15 and the axle 16 and proceeds through the openings 17 into the lower part of the drum body 3. The coolant then moves upward, cooles the set of the fuel assemblies 5 and enters through the opening 13 into the pipeline 14 for the removal of the coolant 2.

In case of a rupture of the coolant supply pipeline 1, the level 4 of the coolant 2 cannot come down below the level of the upper end of the pipe 15.

The proposed system for cooling a set of fuel assemblies is simple in a design and in case of a rupture of the coolant supply pipeline provides for effective cooling of the fuel assemblies due to natural circulation of the coolant.

What is claimed is:

1. A system for cooling a set of fuel assemblies of a nuclear reactor, comprising:

a vessel containing the set of fuel assemblies;

a pipeline for supplying coolant to the lower part of said vessel so that the coolant fills the vessel to a first predetermined level above the active portion of the fuel assemblies;

a hollow cylindrical member extending vertically upward from a central portion of the bottom of said vessel to a height above said first predetermined level, a first part of the interior of said cylindrical member being in communication with a first portion of the interior of said vessel located above said first predetermined level, and a second part of the interior being in communication with a second portion of the interior of said vessel located near the bottom of said vessel;

a first portion of said pipeline extending inside said hollow cylindrical member and having an end located at a second predetermined level located between the active portion of the fuel assemblies and the first predetermined level;

a second portion of said pipeline being positioned outside said vessel and extending to a level below the active portion of the fuel assemblies, the relationship between said hollow cylindrical member and said first portion of said pipeline being such that coolant supplied said vessel through said pipeline enters said hollow cylindrical member from the end of said first portion of said pipeline and leaves said hollow cylindrical member through said second part in communication with the second portion of the interior of said vessel.

* * * * *